Patented Aug. 12, 1941

2,252,332

UNITED STATES PATENT OFFICE 2,252,332

PROCESS OF MAKING FERRIC SULPHATE

James K. Plummer, Atlanta, Ga., assignor to Tennessee Corporation, New York, N. Y., a corporation of New York No Drawing. Application November 29, 1939, Serial No. 306,774

6 Claims. (Cl. 23—126)

This invention relates to the manufacture of ferric sulphate and one of the objects is the production of a water-soluble ferric sulphate of superior quality at a minimum cost.

Another object is to utilize profitably the dust separated or settled from the gases discharged from roasting furnaces operating on iron sulphides, which dust heretofore has been a waste product, involving the manufacturer in burdensome expense for its disposal.

A further object is to afford an additional profitable outlet for the consumption of sulphuric acid.

A still further object is to produce ferric sulphate without the use of heat other than that due to chemical reaction.

Ferric sulphate per se admittedly is not a new product but the methods for its production and the nature and proportions of some of the raw materials employed as herein disclosed are novel, and these novel features will be indicated more particularly as hereinafter set forth and defined in the claims.

With the aforesaid objects in view, I mix sulphuric acid of 63° Bé. concentration or higher with enough ferric oxide ($Fe_2O_3$) to satisfy the acid, enough water also being added to the mixture to reduce the concentration of the sulphuric acid to 60° Bé. This addition of water not only reduces the sulphuric acid to 60° Bé. but also produces enough heat to start the reaction between the acid and oxide. An initial acid concentration below 63° Bé. would require the application of extraneous heat which it is one of the objects of this invention to avoid. A concentration of 66° Bé. gives satisfactory results. The mixture is placed in a suitable mixer and agitated for from five to eight minutes, at the expiration of which time without the application of any extraneous heat the temperature will have risen to 310° F., more or less and I then place the mixture in a heat-insulated tank or silo where the temperature will rise to from 350° F. to 360° F., solely under the influence of the reaction taking place and without the application of any extraneous heat of any kind whatever.

As a suitable source of ferric oxide I prefer to employ ferric oxide found in so-called Cottrell dust or flue dust or dust separated by means of dust chambers, cyclones or the like, or any other dust separated from the gases from furnaces fed with sulphide of iron ore or concentrates, collected from the gases of a furnace burning iron sulphide ores. In most cases this dust constains its iron oxide content almost wholly in the ferric state ($Fe_2O_3$).

Analysis of a typical form of this dust is as follows:

|  | Per cent |
|---|---|
| Total Fe | 50.50 |
| Total S | 8.50 |
| Total $SiO_2$ | 3.60 |
| Free $H_2SO_4$ | Trace |
| Water soluble $Fe^{+++}$ | 8.9 |
| Water soluble $Fe^{++}$ | 0.2 |
| Water soluble S | 8.4 |

The total ferric iron content of the dust will vary from around 45% to as high as 60% present in some cases, and in treating the same with sulphuric acid it will, of course, be understood that the sulphuric acid and the ferric iron content are used in such proportions as to afford sufficient ferric iron to satisfy or completely react with the sulphuric acid.

With Cottrell or similar dust of substantially the analysis given above 66° Bé. acid, ferric oxide dust and water are mixed in approximately the following proportions, to wit:

|  | Pounds |
|---|---|
| 66° sulphuric acid | 756 |
| Ferric oxide dust | 600 |
| Water | 150 |

For the dust analysis given above it is essential that approximately these proportions be maintained, but with dusts of a different composition, the relative proportions of the materials used, of course, may vary.

All of the above materials are fed into a suitable mixer, such for example, as a superphosphate mixer, and are stirred from five to eight minutes, or until the temperature of the mixture rises, without the application of extraneous heat, to approximately 310° F. Usually this temperature will be reached in about six and one half minutes. This temperature is required in order to start the reaction between ferric oxide and sulphuric acid. At the expiration of the mixing, say six and one half minutes, the mass is dropped into a concrete or other heat-insulated bin or silo, and allowed to cook therein until the chemical reaction is substantially completed. As a result of the reaction the temperature will rise to above 350° F., and at the completion of the cooking the reaction between the ferric iron and sulphuric acid produces a product which has a high degree of solubility in cold water, and for a dust of the analysis given above analyzes approximately as follows:

| | Per cent |
|---|---|
| Moisture | 2.60 |
| Cold water soluble $Fe^{+++}$ | 20.50 |
| Cold water soluble $Fe^{++}$ | 0.75 |
| Total Fe | 22.37 |
| Free acid | 0.42 |

What is claimed is:

1. The process of making hydrated ferric sulphate which consists in roasting iron sulphide ores in a suitable furnace, collecting from the furnace gases dust containing insoluble ferric oxide, mixing sulphuric acid of a concentration not less than 63° Bé. with sufficient water to reduce it to approximately 60° Bé. and enough of said dust to satisfy the sulphuric acid, stirring the mixture without the application of external heat and until the reaction raises the temperature to approximately 310° F., and then holding the heat of reaction in the mixture by placing it in a heat insulated chamber and permitting the reaction to complete itself solely under the heat engendered by the reaction.

2. The process of making water-soluble ferric sulphate which consists in mixing sulphuric acid of not less than 63° Bé. with water and dust reclaimed from the gases resulting from the roasting of iron ore, the dust being in sufficient proportions to satisfy the acid and the water being in sufficient proportion to reduce the acid to 60° Bé., thereby raising the temperature of the mixture to approximately 310° F. without the application of heat other than that due to the reaction, and then holding the heat of reaction in the mixture by depositing it in a heat insulated container and permitting the reaction to be completed solely under the heat engendered by the reaction.

3. In the manufacture of water-soluble ferric sulphate, the step of mixing ferric oxide-containing dust, reclaimed from furnace gases resulting from burning iron ore, with sulphuric acid in proportions to satisfy the acid and adding water until the mixture attains a temperature of approximately 310° F. without the addition of external heat.

4. The process of making ferric sulphate which consists in mixing iron-oxide-containing furnace dust, reclaimed from furnace gases when burning iron ore, with water and sulphuric acid, the iron oxide in the dust being in proportions to satisfy the acid, maintaining the mixing action until the mixture attains a temperature of approximately 310° F. without the addition of external heat, then transferring the mixture to a heat insulated chamber to retain the heat of reaction in the mixture, and retaining the mixture in said chamber until chemical reaction ceases.

5. The process of making ferric sulphate which consists in mixing iron-oxide-containing furnace dust, reclaimed from furnace gases when burning iron ore, with water and sulphuric acid, the iron oxide in the dust being in proportions to satisfy the acid, maintaining the mixing action until the mixture attains a temperature of approximately 310° F. solely as the result of the reaction, then transferring the mixture to a heat-insulated chamber, and retaining the mixture in said chamber until said mixture has attained a temperature of approximately 350°–360° F. solely as the result of the chemical reaction.

6. The process which consists in mixing sulphuric acid of not less than 63° Bé. with Cottrell dust containing sufficient ferric oxide to satisfy the acid, adding water sufficient to reduce the acid to 60° Bé., agitating the mixture without extraneous heat and until a temperature of approximately 310° F. is reached, and then retaining the heat of the mixture due to reaction in a heat insulated chamber without addition of external heat and until the reaction is complete.

JAMES K. PLUMMER.